United States Patent
Okuda et al.

(10) Patent No.: US 6,921,876 B2
(45) Date of Patent: Jul. 26, 2005

(54) METHOD FOR ADJUSTING NOZZLE GAP

(75) Inventors: Shinji Okuda, Yamanashi (JP);
Mitsuyoshi Ishihara, Yamanashi (JP);
Junichi Kato, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 11 days.

(21) Appl. No.: 10/856,977

(22) Filed: May 28, 2004

(65) Prior Publication Data

US 2004/0238498 A1 Dec. 2, 2004

(30) Foreign Application Priority Data

May 29, 2003 (JP) ........................................ 2003-152970

(51) Int. Cl.[7] .............................. B23H 7/02; B23H 7/10
(52) U.S. Cl. ................................................... 219/69.12
(58) Field of Search ............................ 219/69.12, 69.17

(56) References Cited

U.S. PATENT DOCUMENTS

| 4,833,290 A | * | 5/1989 | Obara ..................... 219/69.12 |
| 4,975,557 A | * | 12/1990 | Yamada et al. .......... 219/69.12 |

FOREIGN PATENT DOCUMENTS

| EP | 0 680 800 A1 | 11/1995 | |
| EP | 680800 B1 | * 4/1998 | |
| JP | 61-19516 A | * 1/1986 | ............... 219/69.12 |
| JP | 61-90828 | 5/1986 | |
| JP | 2-192724 | 6/1990 | |
| JP | 2576050 | 11/1995 | |
| JP | 7-299660 | 11/1995 | |

* cited by examiner

*Primary Examiner*—Geoffrey S. Evans
(74) *Attorney, Agent, or Firm*—Burns, Doane, Swecker & Mathis, L.L.P.

(57) ABSTRACT

A method for adjusting the gap between an upper nozzle of a wire electric discharge machine includes placing a spacer member of a known thickness between a forward end of the upper nozzle and a workpiece. The forward end of the upper nozzle is brought into contact with the spacer member, so that the forward end of the upper nozzle is prevented from coming into direct contact with the workpiece. A Z-axis position of the upper nozzle is controlled on the basis of the thickness of the spacer member and the desired nozzle gap to set the gap between the forward end of the upper nozzle and the workpiece to a predetermined value. In controlling the Z-axis position of the upper nozzle, correction is made to compensate for a deformation of the upper guide, the spacer member, the workpiece, and the upper nozzle, and/or for a displacement of the upper guide resulting from a pressure of a working fluid.

10 Claims, 9 Drawing Sheets

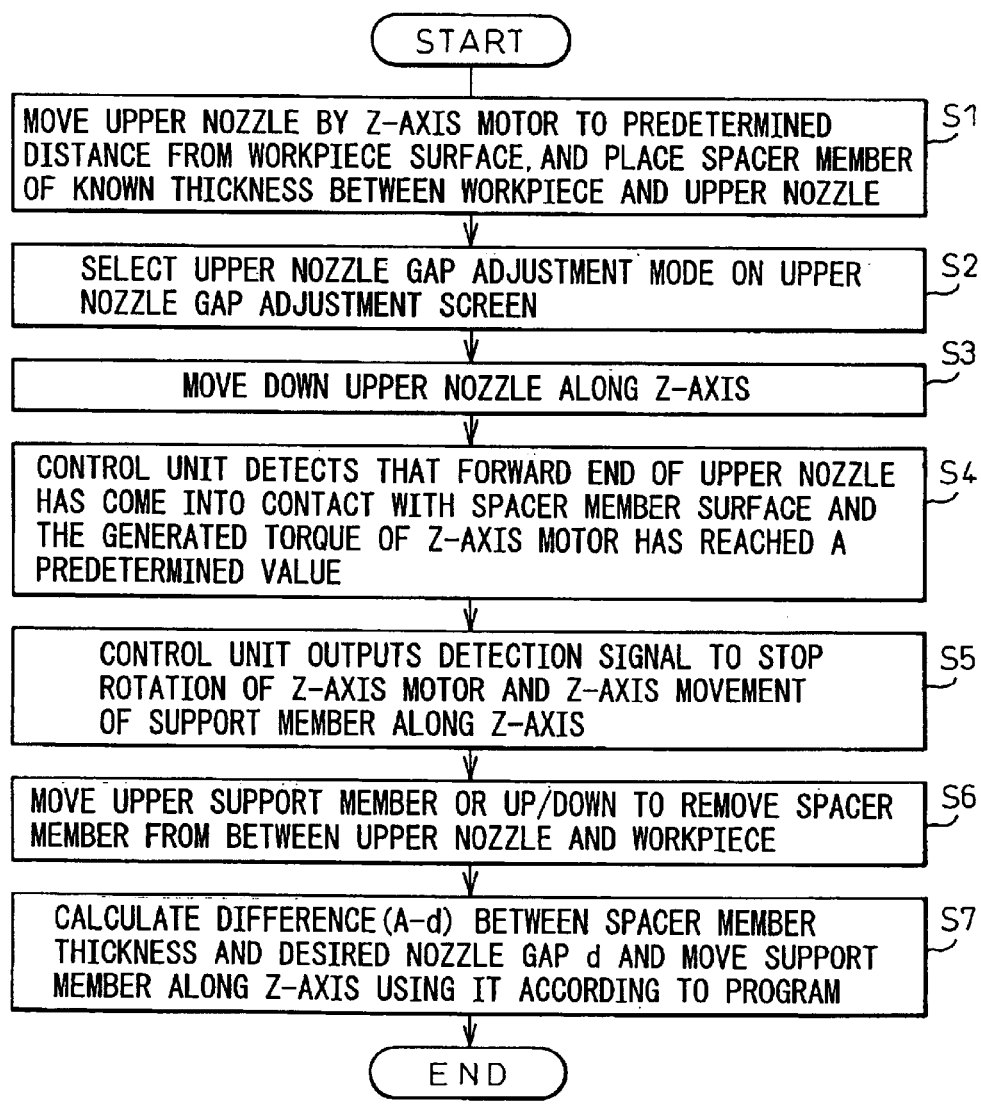

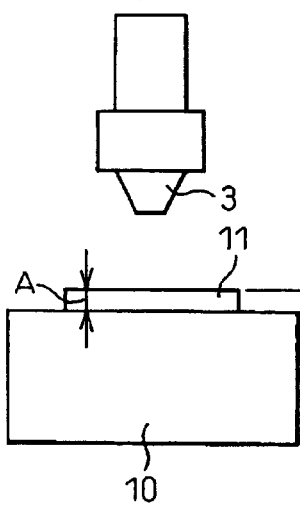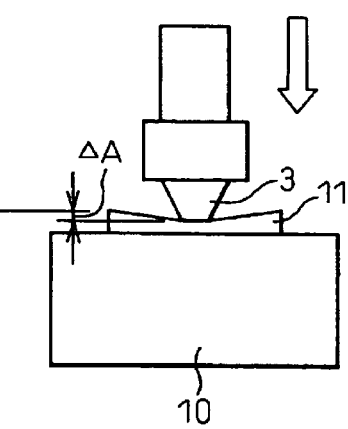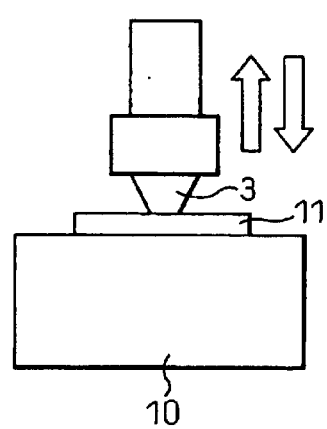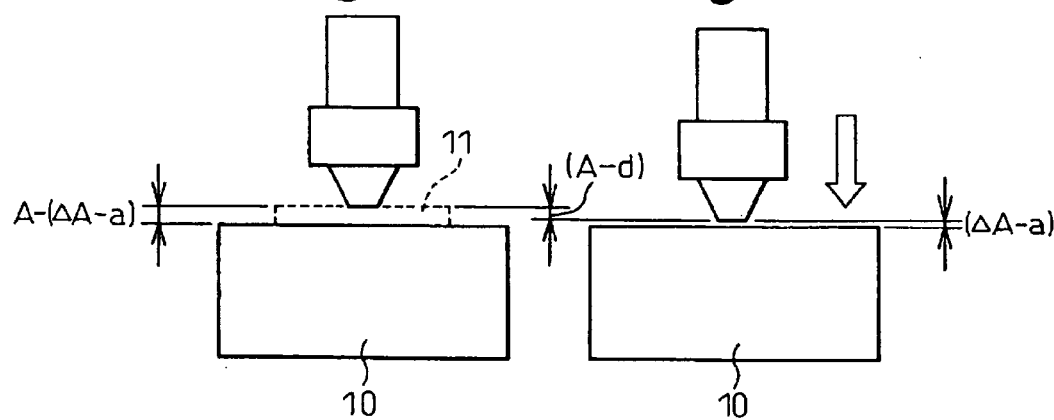

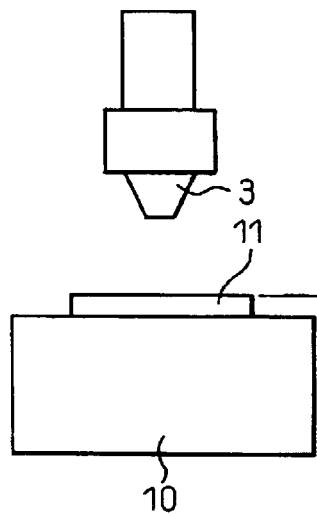
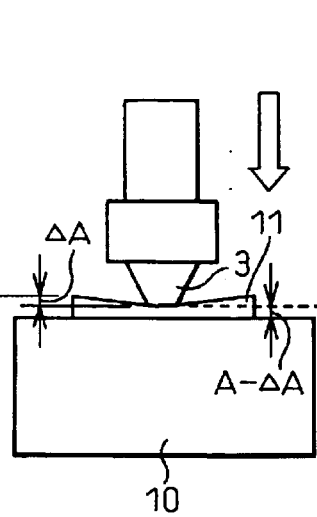
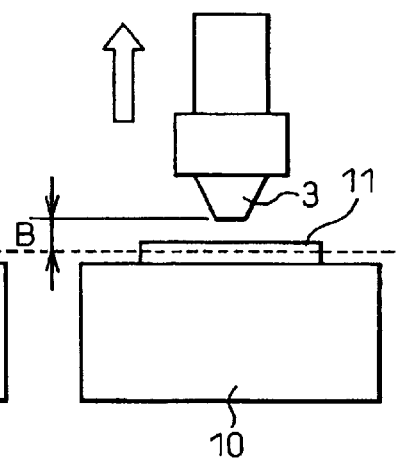
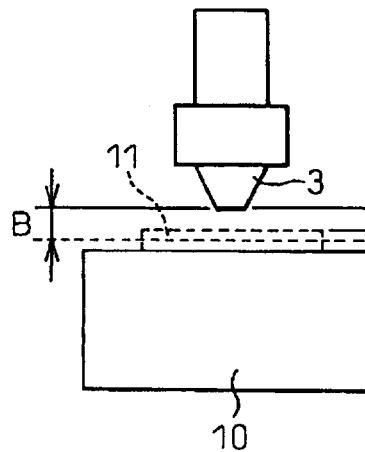
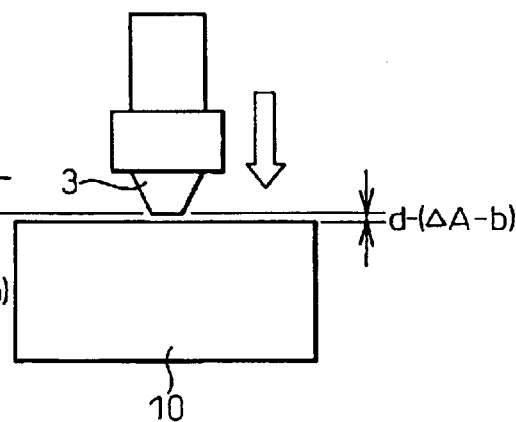

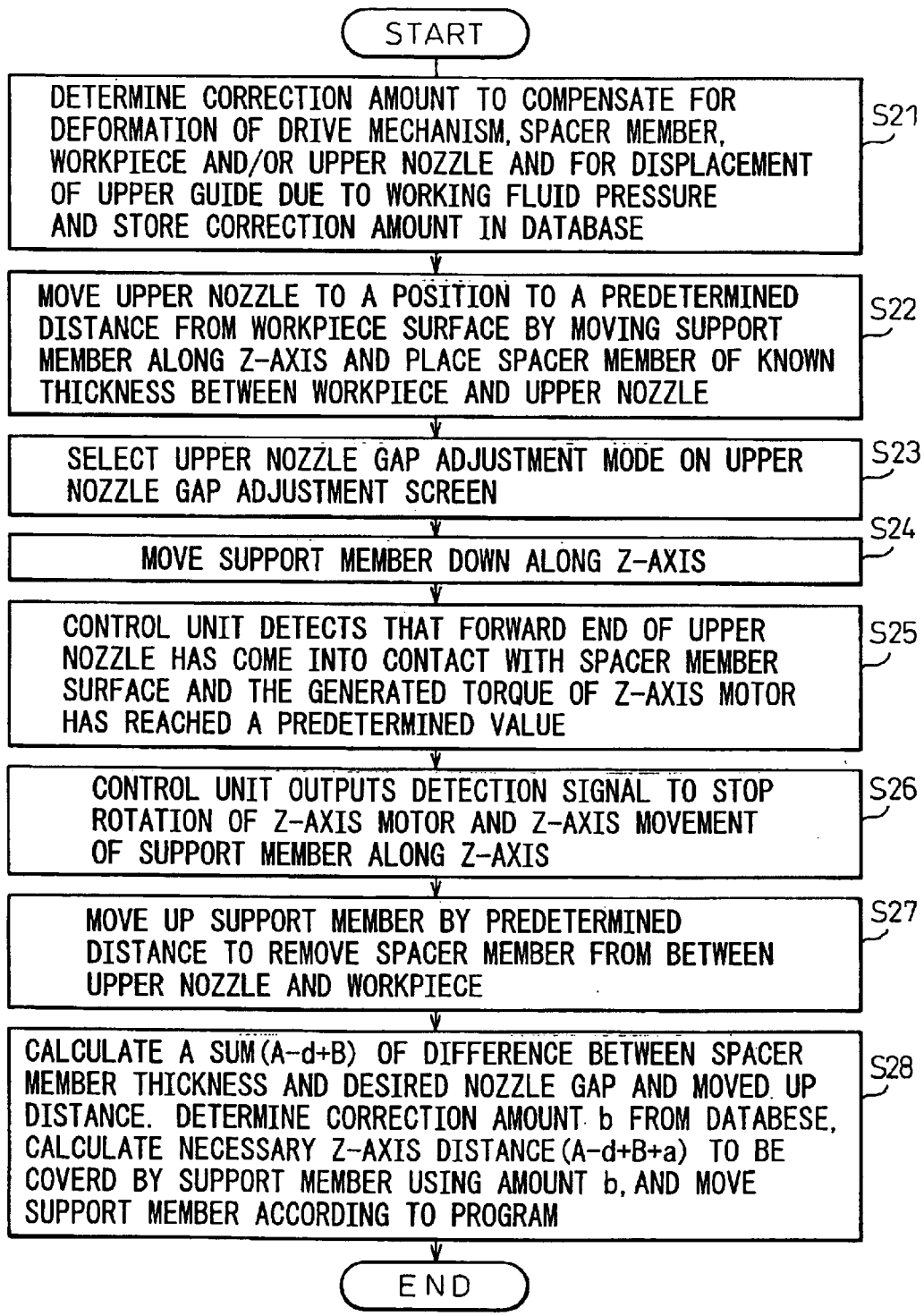

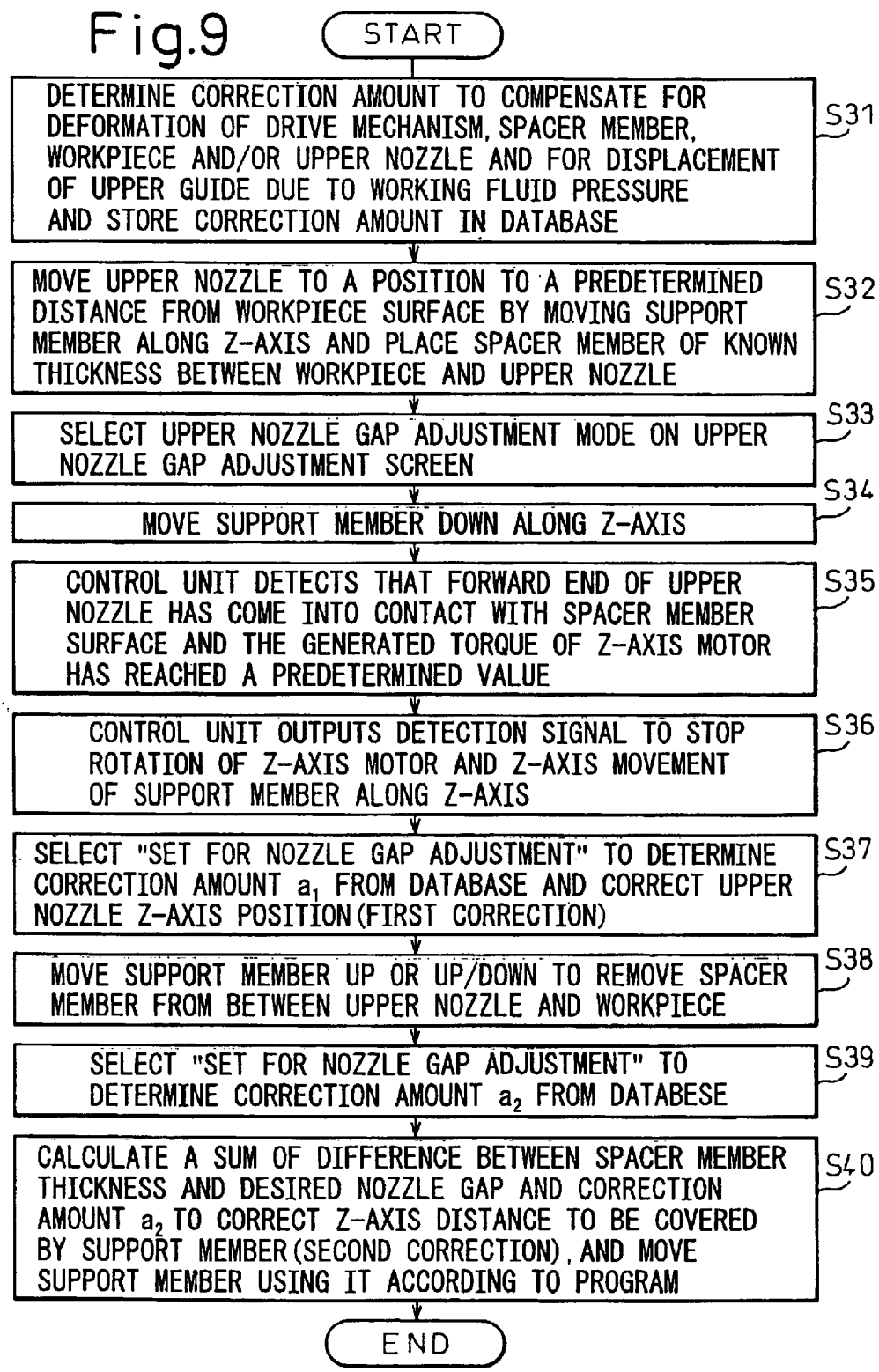

METHOD FOR ADJUSTING NOZZLE GAP

BACKGROUND OF THE INVENTION

1. Field of the Invention

The present invention relates to a nozzle gap adjusting method for setting a predetermined small gap, without contact, between a working fluid ejection nozzle and a workpiece in a wire electric discharge machine.

2. Description of the Related Art

In a wire electric discharge machine (wire EDM), a wire electrode is fed in an axial direction thereof while moving a workpiece and the wire electrode relatively to each other in a direction substantially perpendicular to the axial direction of the wire electrode. In the process, working fluid is ejected from a nozzle toward the machined portion, and intermittent voltage pulses (or voltage pulses constituting discharge pulses) are applied between the wire electrode and the workpiece so that the electric discharge is generated to machine the workpiece.

In this wire EDM, the positioning and adjustment of the upper nozzle is performed to set a predetermined gap between the upper nozzle and the workpiece. Especially, the upper nozzle gap is required to be set properly in order to prevent the wear of the nozzle and to achieve a normal machining accuracy and normal machining rate.

In the prior art, the operator sets the upper nozzle gap by inserting a gap gauge between the upper nozzle and the workpiece and moving a Z-axis moving member along the Z-axis while checking the gap size, setting the Z-axis moving member in position to secure the desired upper nozzle gap. In this way, all the jobs for nozzle gap adjustment are carried out manually and, therefore, the problem is posed that such an adjustment consumes much time on the one hand and the result of adjustment is undesirably varied on the other hand.

Specifically, in order to prevent the nozzle wear and maintain a stable machining rate and machining accuracy, it is desirable to maintain a predetermined small gap between the forward end of the nozzle and the workpiece during the machining. However, no conventional method is available whereby the gap can be set both rapidly and accurately. In order to obviate this situation, Japanese Patent No. 2576050 proposes a nozzle apparatus in which a forward end of a nozzle is brought into contact with a surface of a workpiece and then separated from the workpiece surface by a predetermined distance thereby to secure a predetermined distance between the nozzle forward end and the workpiece surface.

However, in the nozzle apparatus disclosed in the above-described patent, since the forward end of the nozzle is brought into contact with the workpiece and the nozzle position setting is performed with reference to a contact point between the forward end of the nozzle and the workpiece, a problem is encountered that the machine may be damaged by the contact with the workpiece.

SUMMARY OF THE INVENTION

Accordingly, it is an object of the present invention to solve the above-mentioned problems and to set the gap between the forward end of the upper nozzle and the workpiece to a predetermined distance without the damage which might otherwise be caused by the contact between the machine and the workpiece.

A nozzle gap adjusting method according to the present invention is a method for adjusting a gap between an upper nozzle of a wire electric discharge machine and a workpiece, in which a spacer member of a predetermined thickness is inserted between the forward end of the upper nozzle and the workpiece, and in which the forward end of the upper nozzle is prevented from coming into direct contact with the workpiece by bringing the forward end of the upper nozzle into contact with the spacer member, while the gap between the forward end of the upper nozzle and the workpiece is set at a predetermined value by controlling the position of the upper nozzle along the Z-axis, based on the thickness of the spacer member and the desired nozzle gap.

The nozzle gap adjusting method according to the invention also includes a correcting step to compensate for a deformation of a guide, the spacer member, the workpiece and/or the nozzle and a displacement of an upper guide due to the pressure of the working fluid.

The wire electric discharge machine (EDM) to which the present invention is applicable includes a machining power supply for generating an electric discharge between a wire electrode and a workpiece, an upper nozzle for supplying the working fluid between the wire electrode and the workpiece, an upper guide for holding the upper nozzle, a servo motor for driving the upper guide along an axis of the wire electrode and a control unit for controlling the servo motor.

According to one aspect of the nozzle gap adjusting method of the present invention, there is provided a method for adjusting a gap between the upper nozzle and the workpiece, which includes the steps of:

arranging a spacer member of a known thickness between the workpiece and the upper nozzle;

moving the upper nozzle toward the workpiece thereby to bring the upper nozzle into contact with the spacer member;

separating the upper nozzle from the workpiece by a predetermined distance after detecting the contact between the upper nozzle and the spacer member;

removing the spacer member from between the workpiece and the upper nozzle; and approximating the upper nozzle into proximity with the workpiece so that the upper nozzle and the workpiece are spaced away from each other by a desired gap distance;

wherein the gap between the upper nozzle and the workpiece is adjusted by moving the upper nozzle by a length equal to the distance determined on the basis of the thickness of the spacer member and the desired gap distance between the upper nozzle and the workpiece.

In the first aspect of the present invention, the forward end of the upper nozzle comes into contact with the spacer member but not into direct contact with the workpiece when adjusting the gap, and therefore the damage to the machine which might otherwise be caused by the direct contact between the workpiece and the forward end of the upper nozzle can be prevented.

According to a second aspect of the nozzle gap adjusting method of present invention, in at least one of the upper nozzle moving, upper nozzle separating and upper nozzle approximating steps in the first aspect, a distance to be covered by the upper nozzle (i.e., a distance by which the upper nozzle is moved) is corrected, based on a predetermined correction amount. In this aspect of the present invention, the correction is carried out to compensate for the deformation of the upper nozzle, etc. caused by the upper nozzle coming into contact with the spacer member, the displacement of the upper guide due to the pressure of the working fluid, and/or other factors, thereby making it possible to set the gap between the forward end of the upper nozzle and the workpiece to a more accurate value.

In the first form of the correction carried out in the second aspect of the present invention, the correction is carried out in the upper nozzle separating step. Specifically, the upper nozzle is separated, in the upper nozzle separating step, from the workpiece by at least a distance equal to the sum of the deformation amount of a mechanism part due to the contact between the upper nozzle and the spacer member and the displacement amount of the upper guide due to the pressure of the working fluid.

In the second form of the correction carried out in the second aspect of the present invention, the correction is carried out in the upper nozzle approximating step. Specifically, after the upper nozzle is separated, in the upper nozzle separating step, by a predetermined distance so that the spacer member is removed from between the forward end of the upper nozzle and the workpiece, the distance to be covered by the upper nozzle is corrected, in the upper nozzle approximating step, by use of a predetermined correction amount to move the upper nozzle closer to the workpiece. The correction amount includes a correction component to compensate for a deformation amount of a mechanism part due to the contact between the upper nozzle and the workpiece and a correction component to compensate for a displacement amount of the upper nozzle due to the pressure of the working fluid. This correction amount is used to correct the distance to be covered by the upper nozzle as determined based on the distance by which the upper nozzle is separated from the workpiece in the upper nozzle separating step, the thickness of the spacer member and the desired gap distance between the upper nozzle and the workpiece.

In the third form of the correction carried out in the second aspect of the present invention, the correction is carried out in both the upper nozzle separating step and the upper nozzle approximating step. Specifically, a first correction is carried out in the upper nozzle separating step, in which the upper nozzle is separated from the workpiece by at least an amount equivalent to the deformation amount of the mechanism part due to the contact detection. A second correction is carried out in the upper nozzle approximating step, in which the upper guide is moved closer to the workpiece by a distance determined by taking into account the displacement of the upper guide due to the pressure of the working fluid.

The deformation amount of the mechanism part includes an amount of deformation of the guide, the spacer member, the workpiece and/or the upper nozzle. The correction amount to compensate for the deformation caused when the forward end of the upper nozzle comes into contact with the spacer member is a value in a direction of moving upward along the Z-axis, while the correction amount to compensate for the displacement of the upper guide due to the pressure of the working fluid is a value in a direction of moving downward along the Z-axis.

In the gap adjusting method according to the present invention, the contact between the upper nozzle and the spacer member can be detected based on the magnitude of the load torque of the servo motor. The contact between the upper nozzle and the spacer member can be also detected by use of the feed rate or the positional deviation along the Z-axis or by a contact sensor disposed at the forward end of the upper nozzle.

As another alternative, a relation between the magnitude of the load torque and an amount of deformation of at least one of the guide, the spacer member, the workpiece and the upper nozzle is determined in advance, and the deformation amount is determined from the load torque so that the correction is carried out by the deformation amount thus determined.

BRIEF DESCRIPTION OF THE DRAWINGS

The above and other objects, features and advantages of the present invention will be described in more detail below based on the preferred embodiments with reference to the accompanying drawings, wherein:

FIG. 3 is a flowchart for explaining the steps of the method according to the first embodiment of the present invention;

FIG. 4A–E are schematic diagrams for explaining the steps of a method according to a second embodiment of the present invention;

FIG. 6A–E are schematic diagrams for explaining the steps of a method according to a third embodiment of the present invention;

FIG. 7 is a flowchart for explaining the steps of the method according to the third embodiment of the present invention;

FIG. 9 is a flowchart for explaining the steps of the method according to the fourth embodiment of the present invention.

DETAILED DESCRIPTION

Embodiments of the invention are explained in detail below with reference to the accompanying drawings.

Figure 1:
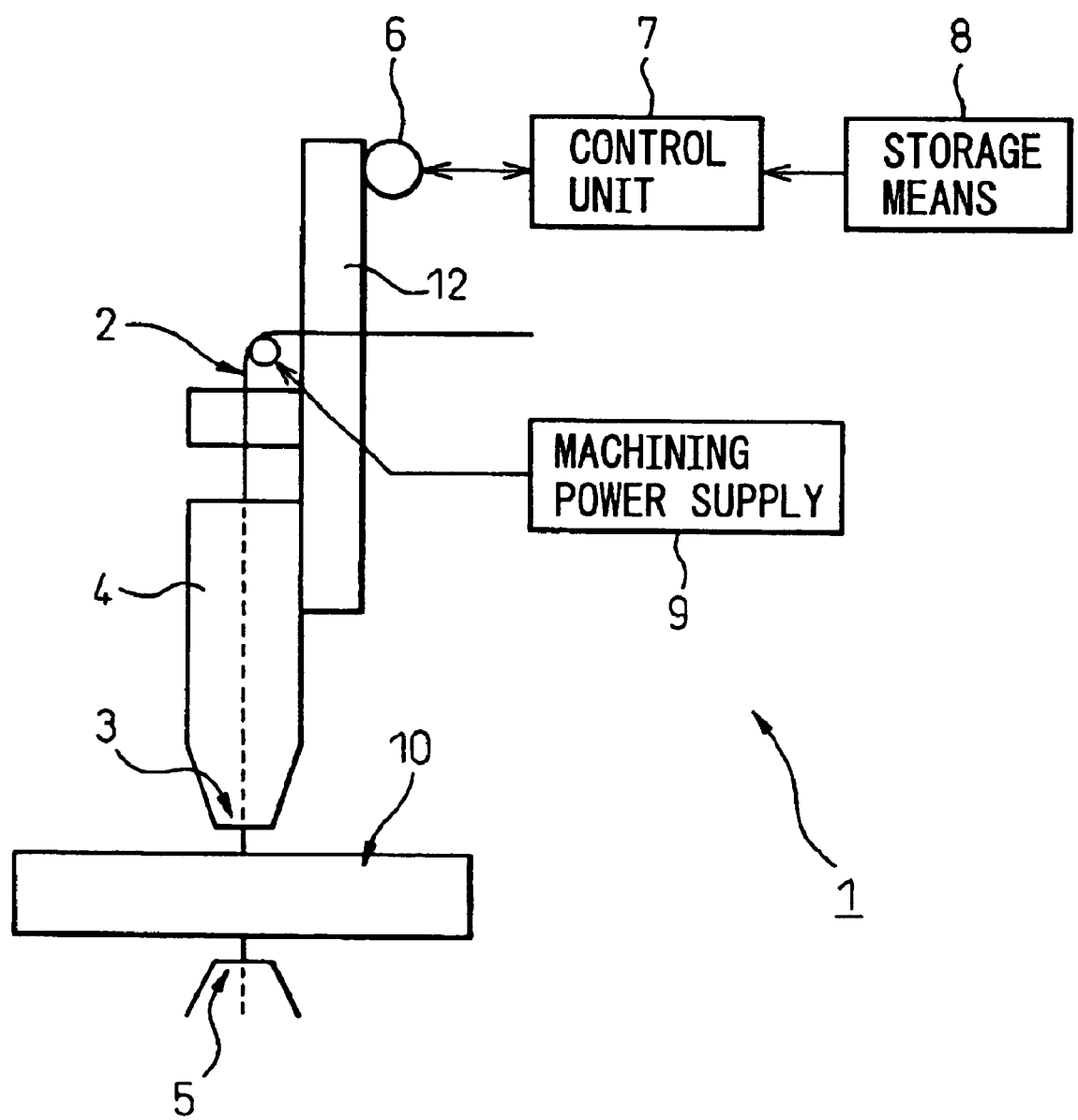
FIG. 1 is a schematic diagram for explaining a configuration of parts surrounding a nozzle of a wire electric discharge machine according to the present invention.

FIG. 1 is a schematic diagram for explaining the configuration of parts surrounding a nozzle of a wire electric discharge machine (hereinafter referred to as a "wire EDM") to which the invention is applicable.

Referring to FIG. 1, a workpiece 10 is machined by electric discharge generated between the workpiece 10 and a wire electrode 2 to which a voltage is applied from a machining power supply 9. The wire electrode 2 extends through an upper nozzle 3 and a lower nozzle 5 and is adapted to move relative to the workpiece 10.

The upper nozzle 3 and the lower nozzle 5 are hollow cylindrical nozzles arranged on both sides of the workpiece 10, and each of them has a wire guide arranged therein. The upper nozzle 3 and the lower nozzle 5 also have mounted thereon a machining hose for working fluid. Working fluid is supplied through the machining hose to the upper nozzle 3 and the lower nozzle 5 at a predetermined flow rate under a predetermined pressure. In this way, the working fluid cools the wire guides in the upper nozzle 3 and the lower nozzle 5 and is then ejected toward the workpiece 10 from the upper nozzle 3 and the lower nozzle 5 thereby to cool the machined portion and the wire electrode 2.

The upper guide 4 is mounted on a support member 12 driven by a Z-axis servo motor 6 and vertically adjustable, so that a gap between a forward end of the upper nozzle 3 and the workpiece 10 can be adjusted. The drive operation of the Z-axis servo motor 6 is controlled by a control unit 7.

The wire EDM 1 includes a storage means 8 for storing a correction amount, and the control unit 7 corrects a position of the forward end of the upper nozzle 3 by retrieving the correction amount from the storage means 8. The control unit 7 also detects whether or not the Z-axis servo motor 6 has reached a predetermined torque, and stops the Z-axis servo motor 6 thereby to stop the movement of the support member 12 along the Z-axis when the predetermined torque is reached.

According to the present invention, the correction amount to compensate for deformation of a drive mechanism for the upper nozzle 3, a spacer member 11 (see FIGS. 2A to 2E) described later, the workpiece 10 and the upper nozzle 3 and for displacement of the upper guide 4 due to the pressure of the working fluid is determined in advance on the basis of the experiment results, etc. and stored as a database in the storage means 8. The deformation amount of the mechanism part herein means that of the upper guide 4, the spacer member 11, the workpiece 10 and/or the upper nozzle 3. The correction amount to compensate for the deformation caused by the contact between the forward end of the upper nozzle 3 and the spacer member 11 has a value in an upward direction along the Z-axis, and the correction amount to compensate for the displacement of the upper guide 4 due to the pressure of the working fluid has a value in a downward direction along the Z-axis.

When "Set for nozzle gap adjustment" is selected, the control unit 7 reads a corresponding correction amount from the storage means 8 and corrects the distance coverage of the upper nozzle 3 (and, therefore, the support member 12) by the particular correction amount. For example, the relation between the load torque generated when the forward end of the upper nozzle 3 comes into contact with the spacer member 11 and the corresponding deformation amount of the spacer member 11, the upper nozzle 3 and the drive mechanism, etc. and the correction amount required to compensate for such the deformation amount are determined on the basis of the experiment or the like and stored in the storage means 8 in advance. When the forward end of the upper nozzle 3 is brought into contact with the spacer member 11, the load torque is detected, and with this load torque as a parameter, a necessary correction amount is determined on the basis of the relation described above. The distance to be covered by the upper nozzle 3 (and, therefore, the support member 12), i.e., the distance by which the upper nozzle 3 is moved, is then corrected by the correction amount thus determined.

The embodiments of the method for adjusting the gap between the upper nozzle 3 and the workpiece 10 according to the present invention will be described below.

In the method according to a first embodiment of the present invention, the forward end of the upper nozzle 3 is prevented from coming into direct contact with the workpiece 10 by placing the spacer member 11 of a known thickness between the upper nozzle 3 and the workpiece 10 and adjusting the gap between them. FIGS. 2A to 2E and 3 are schematic diagrams and a flowchart, respectively, for explaining the steps of the method according to the first embodiment. In FIGS. 2A to 2E, only the upper nozzle 3, the workpiece 10 and the spacer member 11 are shown, while the remaining parts of the wire EDM 1 is omitted.

Figure 2A:
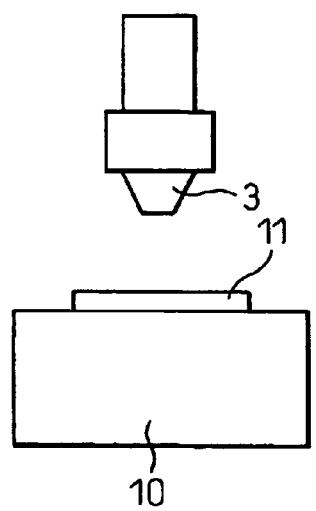
FIG. 2A–E are schematic diagrams for explaining the steps of the method according to a first embodiment of the present invention.

As shown in FIG. 2A, the upper nozzle 3 is at first moved to a position at some distance apart from the surface of the workpiece 10 by moving the support member 12 along the Z-axis, and the spacer member 11 of a known thickness is placed between the upper nozzle 3 and the workpiece 10 (at step S1). The known thickness of the spacer member 11 is given as character A.

On an upper nozzle gap adjustment screen of the control unit 7, an upper nozzle gap adjustment mode is selected (at step S2), and the support member 12 is moved down along the Z-axis by activating the drive mechanism thereby to move the upper nozzle 3 toward the workpiece 10 (at step S3).

Figure 2B:
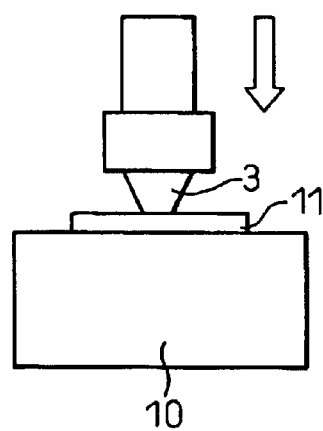

As shown in FIG. 2B, when the forward end of the upper nozzle 3 comes into contact with the surface of the spacer member 11, the generated torque of the Z-axis servo motor 6 reaches a predetermined value. The control unit 7 detects the contact by sensing the load torque, and outputs a contact detection signal when the sensed load torque reaches a predetermined value (at step S4). This contact detection signal is used to control and stop the rotation of the Z-axis servo motor 6 thereby to stop the Z-axis movement of the support member 12 along the Z-axis (at step S5).

The support member 12 is moved down or up/down along the Z-axis thereby to remove the spacer member 11 located between the forward end of the upper nozzle 3 and the workpiece 10 (at step S6). The Z-axis movement of the support member 12 along the Z-axis for removing the spacer member 11 is carried out, for example, by moving the support member up by a predetermined distance to remove the spacer member 11 and then moving down the support member 11 by the same predetermined distance so that the nozzle 3 is returned to the original position. Alternatively, the Z-axis movement along the Z-axis may be carried out by storing the contact point and moving up the support member 12 and the upper nozzle 3 by an appropriate distance to remove the spacer member 11, after which the upper nozzle 3 is returned to the stored contact point.

Figure 2C:
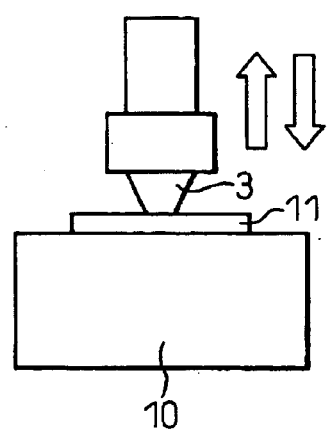
Figure 2D:
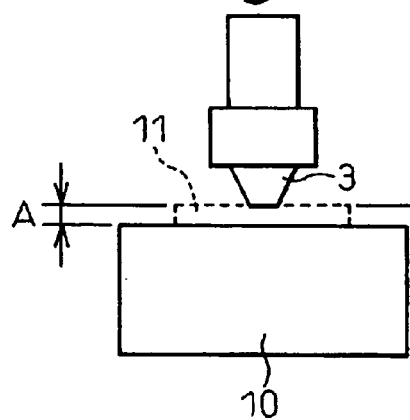

In this way, the distance between the forward end of the upper nozzle 3 and the workpiece 10 is set to a value equal to the thickness A of the spacer member 11 (FIGS. 2C and 2D).

Figure 2E:
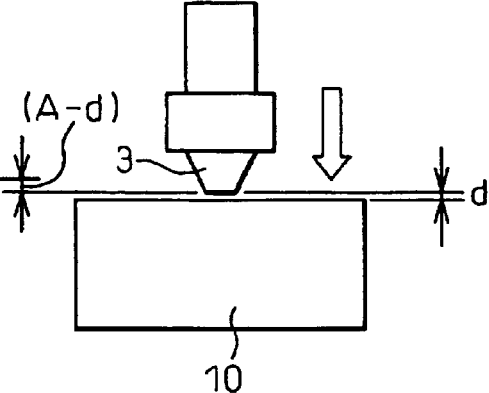
Figure 5:
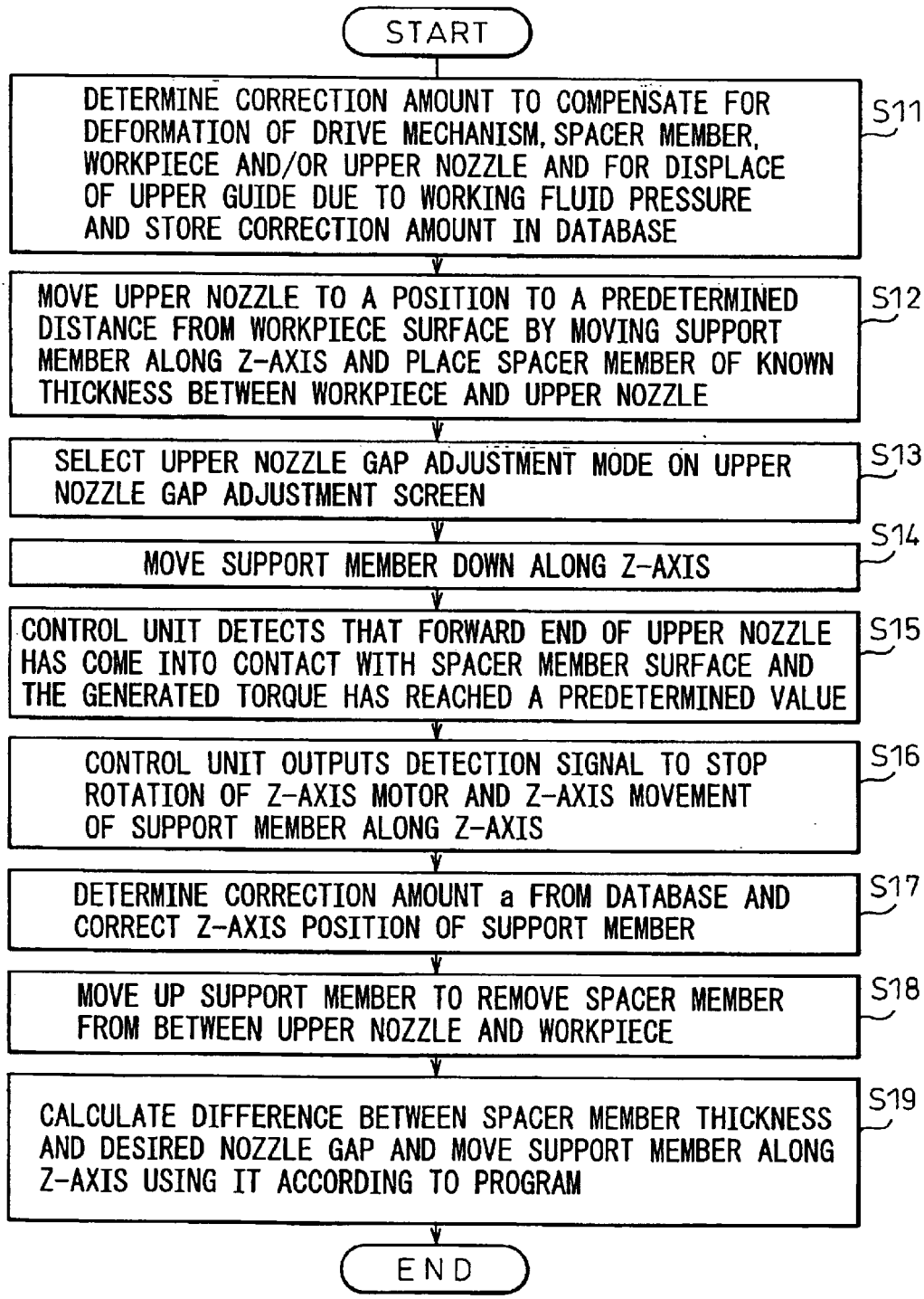
FIG. 5 is a flowchart for explaining the steps of the method according to the second embodiment of the present invention.

In the case that it is desired to set the gap between the forward end of the upper nozzle 3 and the workpiece 10 at a value d rather than a value A, as shown in FIG. 2E, the difference (A–d) between the thickness A of the spacer member 11 and the desired nozzle gap value d is calculated, and the support member 12 is moved along the Z-axis by a distance equal to the difference (A–d) according to a program thereby to adjust the nozzle gap (at step S7).

In the method according to a second embodiment of the present invention, similarly to the first embodiment, the gap is adjusted using the spacer member 11, so that the forward end of the upper nozzle 3 is prevented from coming into direct contact with the workpiece 10 while the correction is made to compensate for the deformation caused by the forward end of the upper nozzle 3 coming into contact with the spacer member 11 and/or for the displacement of the upper guide 4 caused by the pressure of the working fluid.

FIGS. 4A to 4E and 5 are schematic diagrams and a flowchart, respectively, for explaining the steps of the method according to the second embodiment of the present invention. In FIGS. 4A to 4E, only the upper nozzle 3, the workpiece 10 and the spacer member 11 are shown, while the remaining parts of the wire EDM 1 is omitted.

When the forward end of the upper nozzle 3 comes into contact with the spacer member 11, the drive mechanism, the workpiece 10, the upper nozzle 3 and the spacer member 11, etc. are deformed. Also, when the coolant (working fluid) is supplied from the upper guide 4, the upper guide 4 is displaced under the pressure of the working fluid. Such deformation and displacement cause the deviation of the position of the upper nozzle 3. In the method according to the second embodiment of the present invention, the correction is made to compensate for such deformation and displacement in the step of separating the upper nozzle 3 from the workpiece 10 and the spacer member 11.

In preparation for this correction, the relation between a load torque generated by the contact between the forward end of the upper nozzle 3 and the spacer member 11 and a deformation of the drive mechanism, the spacer member 11, the workpiece 10 and/or the upper nozzle 3 as well as a displacement of the upper guide 4 due to a pressure of the working fluid is determined in advance by experiments or simulation. Further, a correction amount required to compensate for the deformation and/or the displacement is determined from the results of the experiments or simulation and stored in the data base (at step S11).

Next, as in steps S1 to S5 of the first embodiment, as shown in FIG. 4A, the upper nozzle 3 is moved to a position at a predetermined distance from the surface of the workpiece 10 by moving the support member 12 along the Z-axis, and the spacer member 11 of a known thickness A is placed between the upper nozzle 3 and the workpiece 10 (at step S12).

On the upper nozzle gap adjustment screen of the control unit 7, the upper nozzle gap adjustment mode is selected (at step S13), and the support member 12 is moved down along the Z-axis by activating the drive mechanism thereby to move the upper nozzle 3 toward the workpiece 10 (at step S14).

As shown in FIG. 4B, when the forward end of the upper nozzle 3 comes into contact with the surface of the spacer member 11, the generated torque of the Z-axis servo motor 6 reaches a predetermined value. The control unit 7 detects the contact by sensing this load torque, and outputs a contact detection signal when the sensed load torque reaches a predetermined value (at step S15). This contact detection signal is used to control and stop the rotation of the Z-axis servo motor 6 thereby to stop the movement of the support member 12 (at step S16). The amount of deformation at the time of contact detection is given as ΔA.

Next, the corresponding correction amount a is determined using the database, and the Z-axis distance to be covered by the support member 12 (i.e., the Z-axis distance by which the support member 12 is moved along the Z-axis) and the upper nozzle 3 is corrected by the correction amount a (at step S17). The correction amount a is a correction component to compensate for the deformation of all the parts and for the displacement of the upper guide 4. Specifically, a relation between the load torque generated by the contact between the forward end of the upper nozzle 3 and the spacer member 11 on the one hand and the deformation of various parts and the displacement of the upper guide 4 due to the pressure of the working fluid on the other hand, as well as a correction amount required to compensate for the same deformation and displacement, are stored in a database. Then, a corresponding correction amount a is determined by using, as a parameter, the load torque as a parameter obtained at the time of detecting the contact between the forward end of the upper nozzle 3 and the spacer member 11 in the aforementioned process and read from this database (FIG. 4C).

The Z-axis position of the support member 12 is corrected using the corresponding correction amount a that has been read, and the upper nozzle 3 is set in position at a predetermined distance from the surface of the workpiece 10 by moving the support member 12 along the Z-axis.

After correcting the Z-axis position, the support member 12 is moved up to remove the spacer member 11 located between the upper nozzle 3 and the workpiece 10 (at step S18). As an alternative, this removal of the support member 11 may be achieved by moving up the support member 12 by a predetermined distance to remove the spacer member 11 and then moving down the support member 12 by the same predetermined distance thereby to return the upper nozzle 3 to the original position. As another alternative, the removal of the support member 11 may be achieved by storing the contact point and moving up the support member 12 and the upper nozzle 3 by an appropriate distance to remove the spacer member 11, after which the upper nozzle 3 is returned to the stored contact point.

The correction amount a includes a correction component to compensate for the displacement of the upper guide 4 due to the pressure of the working fluid, which corresponds to the difference (ΔA−a) between the deformation amount ΔA and the correction amount a. Therefore, the distance between the forward end of the upper nozzle 3 and the workpiece 10 is set to a value equal to the difference (A−(ΔA−a)) between the thickness A of the spacer member 11 and the previously calculated value (ΔA−a) (FIG. 4D).

Next, the difference (A−d) between the thickness A of the spacer member 11 and the desired nozzle gap d is calculated, and the support member 12 is moved along the Z-axis by a distance equal to the difference (A−d) according to a program thereby to adjust the nozzle gap (at step S19). As a result, the distance between the forward end of the upper nozzle 3 and the workpiece 10 is set to (d−(ΔA−a)) (FIG. 4E), where (ΔA−a) is a correction component to compensate for the displacement of the upper guide 4 due to the pressure of the working fluid.

In the method according to a third embodiment of the present invention, similarly to the first embodiment, the gap is adjusted using the spacer member 11, so that the forward end of the upper nozzle 3 is prevented from coming into direct contact with the workpiece 10 while the correction is made to compensate for the deformation of various parts caused by the forward end of the upper nozzle 3 coming into contact with the spacer member 11 and/or for the displacement of the upper guide 4 caused by the pressure of the working fluid. In particular, the third embodiment is different from other embodiments in that the correction is made in the step of approximating the upper nozzle 3 into proximity with the workpiece 10.

FIGS. 6A to 6E and 7 are schematic diagrams and a flowchart, respectively, for explaining the steps of the method according to the third embodiment. In FIGS. 6A to 6E, only the upper nozzle 3, the workpiece 10 and the spacer member 11 are shown, while the remaining parts of the wire EDM 1 is omitted.

According to the third embodiment, the correction to compensate for the deformation of the drive mechanism, the workpiece 10, the upper nozzle 3, the spacer member 11, etc. due to the aforementioned contact between the forward end of the upper nozzle 3 and the spacer member 11 and/or for the displacement of the upper guide 4 caused by the pressure of the working fluid is made in the step of approximating the upper nozzle 3 into proximity with the spacer member 11.

In preparation for this correction, as in the steps S11 to S16 of the second embodiment, a deformation of the drive mechanism, the spacer member 11, the workpiece 10 and the upper nozzle 3 as well as a displacement of the upper guide 4 due to a pressure of the working fluid are determined by experiments or simulation. Further, a correction amount required to compensate for the deformation and/or displacement is determined from the result of experiments or simulation and stored in the database (at step S21).

Next, as shown in FIG. 6A, the upper nozzle 3 is moved to a position at a predetermined distance from the surface of the workpiece 10 by moving the support member 12 along the Z-axis, and the spacer member 11 of a known thickness A is placed between the upper nozzle 3 and the workpiece 10 (at step S22). On the upper nozzle gap adjustment screen of the control unit 7, the upper nozzle gap adjustment mode is selected (at step S23), and the support member 12 is moved down along the Z-axis by activating the drive mechanism to move the upper nozzle 3 toward the workpiece 10 (at step S24).

As shown in FIG. 6B, when the forward end of the upper nozzle 3 comes into contact with the surface of the spacer member 11, the generated torque of the Z-axis servo motor 6 reaches a predetermined value. The control unit 7 detects the contact by sensing the load torque and outputs a contact detection signal when the sensed load torque reaches a predetermined value (at step S25). This contact detection signal is used to control and stop the rotation of the Z-axis servo motor 6 thereby to stop the Z-axis movement of the support member 12 along the Z-axis (at step S26).

Next, as shown in FIGS. 6C and 6D, the support member 12 is moved up by a predetermined distance B to remove the spacer member 11 from between the upper nozzle 3 and the workpiece 10 (at step S27). In the process, the distance between the forward end of the upper nozzle 3 and the workpiece 10 is equal to a sum (A−ΔA+B) of a predetermined distance B and the difference between the thickness A of the spacer member 11 and the deformation amount ΔA at the time of contact detection.

The sum (A−d+B) of the difference (A−d) between the thickness A of the spacer member 11 and the desired nozzle gap d and the predetermined distance B by which the spacer member 11 has been moved upward at step S27 is calculated. Further, the correction value b corresponding to the torque at the time of contact is determined using the database, and the distance to be covered by the support member 12 (i.e., the Z-axis distance by which the support member 12 is moved along the Z-axis) is corrected by the correction value b thereby to calculate the actually required distance coverage (A−d+B−b). The correction amount b is a correction component to compensate for the deformation of all the parts and for the displacement of the upper guide 4. Specifically, a relation between the load torque generated by the contact between the forward end of the upper nozzle 3 and the spacer member 11 on the one hand and the deformation of various parts and the displacement of the upper guide 4 due to the pressure of the working fluid on the other hand, as well as a correction amount required to compensate for the same deformation and displacement, are stored in a database. Then, a corresponding correction amount b is determined by using, as a parameter, the load torque obtained at the time of detecting the contact between the forward end of the upper nozzle 3 and the spacer member 11 in the aforementioned process and being read from the database.

Next, the support member 12 is moved, according to a program, by the corrected distance to be covered, thereby to adjust the nozzle gap (at step S28). As a result, the distance between the forward end of the upper nozzle 3 and the workpiece 10 is set to (d−(ΔA−b)) (FIG. 6E), where (ΔA−b) is a correction component to compensate for the displacement of the upper guide 4 due to the pressure of the working fluid.

In the method according to a fourth embodiment of the present invention, similarly to the first embodiment, the gap is adjusted using the spacer member 11, so that the forward end of the upper nozzle 3 is prevented from coming into direct contact with the workpiece 10 while the correction is made to compensate for the deformation of various parts caused by the forward end of the upper nozzle 3 coming into contact with the spacer member 11 and/or for the displacement of the upper guide 4 caused by the pressure of the working fluid. In particular, the fourth embodiment is different from other embodiments in that the correction is made in both the step of separating the upper nozzle 3 from the spacer member 11 and the step of approximating the upper nozzle 3 into proximity with the workpiece 10.

FIGS. 8A to 8E and 9 are schematic diagrams and a flowchart, respectively, for explaining the steps of the method according to the fourth embodiment. In FIGS. 8A to 8E, only the upper nozzle 3, the workpiece 10 and the spacer member 11 are shown, while the remaining parts of the wire EDM 1 is omitted.

According to the fourth embodiment, the correction to compensate for the deformation of the drive mechanism, the workpiece 10, the upper nozzle 3 and the spacer member 11, etc. due to the aforementioned contact between the forward end of the upper nozzle 3 and the spacer member 11 and/or for the displacement of the upper guide 4 caused by the pressure of the working fluid is made in both the step of separating the upper nozzle 3 from the workpiece 10 and the step of approximating the upper nozzle 3 into proximity with the workpiece 10.

In preparation for this correction, as in steps S11 to S16 of the second embodiment and steps S21 to S26 of the third embodiment, a deformation of the drive mechanism, the spacer member 11, the workpiece 10 and the upper nozzle 3 as well as a displacement of the upper guide 4 due to a pressure of the working fluid are determined in advance by experiment or simulation. Further, a correction amount required to compensate for the particular deformation and displacement is determined from the resultant data and stored in the database (at step S31).

Figure 8A:
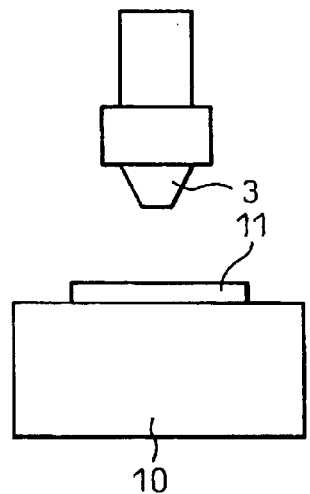
FIG. 8A–E are schematic diagrams for explaining the steps of a method according to a fourth embodiment of the present invention.

Next, as shown in FIG. 8A, the upper nozzle 3 is moved to a position at a predetermined distance from the surface of the workpiece 10 by moving the support member 12 along the Z-axis, and the spacer member 11 of a known thickness A is placed between the upper nozzle 3 and the workpiece 10 (at step S32). On the upper nozzle gap adjustment screen of the control unit 7, the upper nozzle gap adjustment mode is selected (at step S33), and the support member 12 is moved down along the Z-axis by activating the drive mechanism to move the upper nozzle 3 toward the workpiece 10 (at step S34).

Figure 8B:
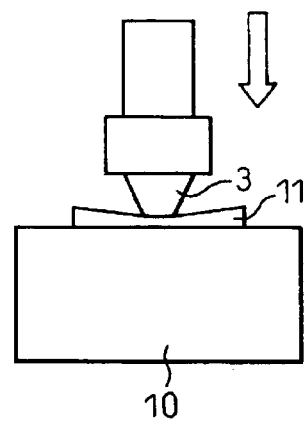

As shown in FIG. 8B, when the forward end of the upper nozzle 3 comes into contact with the surface of the spacer member 11, the generated torque of the Z-axis servo motor 6 reaches a predetermined value. The control unit 7 detects the contact by sensing the load torque and outputs a contact detection signal when the sensed load torque reaches a predetermined value (at step S35). This contact detection signal is used to control and stop the rotation of the Z-axis servo motor 6 thereby to stop the Z-axis movement of the support member 12 along the Z-axis (at step S36).

Figure 8C:
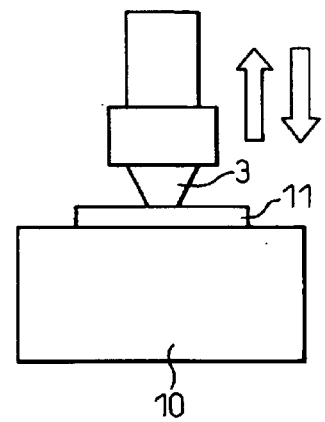

Next, as shown in FIG. 8C, "Set for nozzle gap adjustment" is selected thereby to determine a corresponding correction amount a1 using the database, to correct the Z-axis position of the support member 12 (therefore, the upper nozzle 3) (first correction), and to move the support member 12 up or up/down to move the upper nozzle 3 to the contact point (at step S37). The correction amount a1 is a correction component to compensate for the deformation of the mechanism generated at the time of contact between the forward end of the upper nozzle 3 and the spacer member 11, i.e. the deformation of the upper guide 4, the spacer member 11, the workpiece 10 and/or the upper nozzle 3 and is a value in a direction of moving upward along the Z-axis.

Figure 8D:
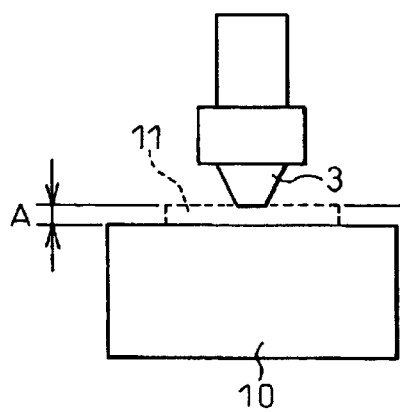

As shown in FIG. 8D, the support member 12 is moved up or up/down to remove the spacer member 11 from between the upper nozzle 3 and the workpiece 10 (at step S38).

Figure 8E:
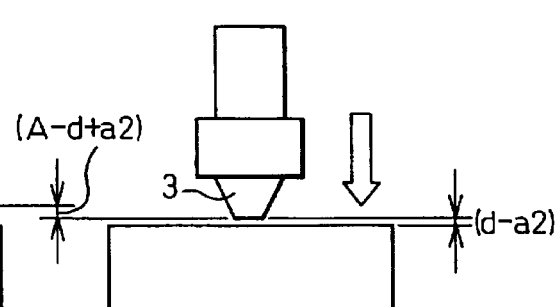

Next, as shown in FIG. 8E, the button "Set for nozzle gap adjustment" is selected thereby to determine a correction amount a2 (at step S39), where the correction amount a2 is a correction component to compensate for the displacement of the upper guide 3 due to the pressure of the working fluid and is a value in a direction of moving downward along the Z-axis.

The sum of the correction amount a2 and the difference (A−d) between the thickness A of the spacer member 11 and the desired nozzle gap d is calculated. Further, the distance to be covered by the support member 12 (i.e., the Z-axis distance by which the support member 12 is moved along the Z-axis) is corrected (second correction), and the support member 12 is moved according to a program by a length equal to the value (A−d+a2) thereby to adjust the nozzle gap (at step S40). As a result, the distance between the forward end of the upper nozzle 3 and the workpiece 10 is set to (d−a2) (FIG. 8E).

According to the first embodiment of the present invention, the spacer member 11 of a known thickness is placed between the upper nozzle 3 and the workpiece 10 to carry out the gap adjustment and, therefore, the forward end of the upper nozzle 3 is prevented from coming into direct contact with the workpiece 10.

According to the second embodiment of the present invention, similarly to the first embodiment, the forward end of the upper nozzle 3 is prevented from coming into direct contact with the workpiece 10, while the correction is made to compensate for the deformation of various parts and/or the displacement of the upper guide 4. The correction can be made in the step of separating the upper nozzle 3 from the spacer member 11, in the step of approximating the upper nozzle 3 into proximity with the workpiece 10 or in both of these steps.

It will thus be understood from the foregoing description that the invention makes it possible to set the distance between the forward end of the upper nozzle 3 and the workpiece 10 to a predetermined value without any damage, to the machine, which might otherwise be caused by the contact with the workpiece 10.

The invention has been described above with reference to the embodiments shown in the accompanying drawings. These embodiments, however, are only illustrative and should not be interpreted as limitative. The scope of this invention, therefore, is defined by the appending claims and the embodiments of the invention can be modified variously without departing from the scope and spirit of the invention.

What is claimed is:

1. A method for adjusting a gap between a workpiece and an upper nozzle of a wire electric discharge machine, said wire electric discharge machine including a machining power supply for generating an electric discharge between a wire electrode and the workpiece, an upper nozzle for supplying working fluid between said wire electrode and said workpiece, an upper guide for holding said upper nozzle, a servo motor for driving said upper guide along an axis of said wire electrode and a control unit for controlling said servo motor, said method comprising the steps of:

arranging a spacer member of a known thickness between said workpiece and said upper nozzle;

moving said upper nozzle toward said workpiece thereby to bring said upper nozzle into contact with said spacer member;

separating said upper nozzle from said workpiece by a predetermined distance after detecting the contact between said upper nozzle and said spacer member;

removing said spacer member from between said workpiece and said upper nozzle; and approximating said upper nozzle into proximity with said workpiece so that said upper nozzle and said workpiece are spaced away from each other by a desired gap distance;

wherein the gap between said upper nozzle and said workpiece is adjusted by moving said upper nozzle by a length equal to the distance determined on the basis of the thickness of said spacer member and the desired gap distance between said upper nozzle and said workpiece.

2. The method according to claim 1, wherein a distance to be covered by said upper nozzle is corrected, based on a predetermined correction amount, in at least one of the upper nozzle moving, upper nozzle separating and upper nozzle approximating steps.

3. The method according to claim 2, wherein said upper nozzle is separated, in the upper nozzle separating step, from said workpiece by at least a distance equal to the sum of a deformation amount of a mechanism part due to the contact between said upper nozzle and said spacer member and a displacement amount of said upper guide due to the pressure of working fluid.

4. The method according to claim 3, wherein the deformation amount of said mechanism part includes an amount of deformation of at least one of said guide, said spacer member, said workpiece and said upper nozzle.

5. The method according to claim 2, wherein said upper nozzle is separated, in the upper nozzle separating step, from said workpiece by at least a deformation amount of the mechanism part due to the contact between said upper nozzle and said spacer member; and wherein said upper guide is moved closer to said workpiece, in the upper nozzle approximating step, by a distance determined by taking into account a displacement amount of said upper guide due to the pressure of the working fluid.

6. The method according to claim 5, wherein the deformation amount of said mechanism part includes an amount of deformation of at least one of said guide, said spacer member, said workpiece and said upper nozzle.

7. The method according to claim 2, wherein said upper nozzle is separated from said workpiece by a predetermined distance in the upper nozzle separating step, and wherein said upper nozzle is moved closer to said workpiece, in the upper nozzle approximating step, by a distance determined from a length by which said upper nozzle is separated from said workpiece in said upper nozzle separating step, a deformation amount of a mechanism part due to the contact between said upper nozzle and said spacer member, a displacement amount of said upper guide due to the pressure of working fluid, the thickness of said spacer member and the desired gap distance between said upper nozzle and said workpiece.

8. The method according to claim 7, wherein the deformation amount of said mechanism part includes an amount of deformation of at least one of said guide, said spacer member, said workpiece and said upper nozzle.

9. The method according to claim 1, wherein the contact between said upper nozzle and said spacer member is detected based on the magnitude of the load torque of said servo motor.

10. The method according to claim 9, wherein a relation between the magnitude of said load torque and an amount of deformation of at least one of said guide, said spacer member, said workpiece and said upper nozzle is determined in advance.

* * * * *